United States Patent [19]

Maurice

[11] Patent Number: 5,403,976
[45] Date of Patent: Apr. 4, 1995

[54] ELECTRICAL CASING WITH TIGHT PASSAGE FOR A POWER SUPPLY CABLE

[75] Inventor: Alain Maurice, Gieres, France

[73] Assignee: Zedel, Crolles, France

[21] Appl. No.: 120,916

[22] Filed: Sep. 15, 1993

[30] Foreign Application Priority Data

Sep. 21, 1992 [FR] France .................. 92 11304

[51] Int. Cl.⁶ ............................................. H02G 3/18
[52] U.S. Cl. ..................................... 174/65 R; 248/56
[58] Field of Search ................ 174/65 R, 151, 52.1; 248/56

[56] References Cited

U.S. PATENT DOCUMENTS 1,714,590  5/1929  Dake .
3,534,146 10/1970  Fell .
4,713,021 12/1987  Kobler .

FOREIGN PATENT DOCUMENTS 644510 10/1928 France .
2835832  3/1980 Germany .
2095051  9/1982 United Kingdom .
2257307  1/1993 United Kingdom ............... 174/52.1

Primary Examiner—Leo P. Picard
Assistant Examiner—Paramita Ghosh
Attorney, Agent, or Firm—Stevens, Davis, Miller & Mosher

[57] ABSTRACT

The end piece for passage of an electrical power supply cable through an orifice of a casing comprises a flexible bearing flange cooperating with an auxiliary securing part arranged as a hollow button having a clamping surface in the shape of a rigid wedge bringing about elastic deformation of the flange, and progressive clamping of the cable when the button moves from a released position to a secured position. The securing part of the passage is an integral part of the insulating wall supporting the contacts.

9 Claims, 6 Drawing Sheets

FIG : 2

ELECTRICAL CASING WITH TIGHT PASSAGE FOR A POWER SUPPLY CABLE

BACKGROUND OF THE INVENTION

The invention relates to a tightly sealed casing made of plastic material for housing an electrical apparatus, comprising a wall equipped with an end piece for the passage of a power supply cable through an orifice, and sealing means designed to seal off the clearance arranged between the orifice and the external face of the cable.

State-of-the-art sealing means to make the casing tight at the level of a passage of a cable or duct are generally shaped as stuffing boxes. The stuffing box system makes use of a sealing ring of annular shape arranged between two clamping surfaces, and an actuating part designed to bring the two clamping surfaces together to crush the sealing ring, resulting in sealing off of the radial clearance remaining between the orifice and cable. Such a system requires several parts to be implemented, with a relatively large assembly time which increases the manufacturing cost of the casing.

A first object of the invention consists in simplifying assembly of a tight passage of an electrical cable, and in reducing the manufacturing cost.

A second object of the invention consists in using a part of the tight passage for auxiliary functions, notably for supporting accessories inside the casing.

SUMMARY OF THE INVENTION

The tight passage according to the invention is characterized in that the end piece of the casing comprises a flexible bearing flange arranged around the cable when the latter passes through the orifice, and that an auxiliary securing part is tightened onto the end piece bringing about elastic deformation of the flange and a simultaneous clamping action of the cable in the sealing zone, said securing part having a clamping surface in the shape of a rigid wedge cooperating with the flange to ensure progressive clamping of the cable when relative movement of said part takes place from a released position to a secured position.

According to a feature of the invention, the flexible flange is an integral part of the casing and is molded directly with the latter. The use of a distinct sealing part presenting risks of incorrect assembly of the passage is thus avoided.

The securing part is shaped as a hollow button or stud through which the cable passes, said clamping surface being arranged inside the button to define a truncated volume of a cross-section suitable for the cable.

The clamping surface has a frustum shape, being located between a first opening and a second opening of the hollow button, the first opening situated facing the flange having a larger diameter than that of said flange in the released position of the button, and the opposite second opening having a smaller diameter than that of the first opening.

The securing part in the secured position in the end piece is securely united to the wall of the casing by fixing means, the pressure on the flange being exerted inside or outside the casing depending on the positioning of said part.

According to a development of the invention, the securing part is securely united to an insulating wall supporting an electrical component arranged inside the casing. In addition to its clamping function ensuring the tightness of the cable passage, the securing part fulfills auxiliary functions of supporting accessories, or of holding the cable inside the casing.

BRIEF DESCRIPTION OF THE DRAWINGS

Other advantages and features will become more clearly apparent from the following description of several illustrative embodiments of the invention, given as non-restrictive examples only and represented in the accompanying drawings, in which.

DESCRIPTION OF THE PREFERRED EMBODIMENT

Figure 1:
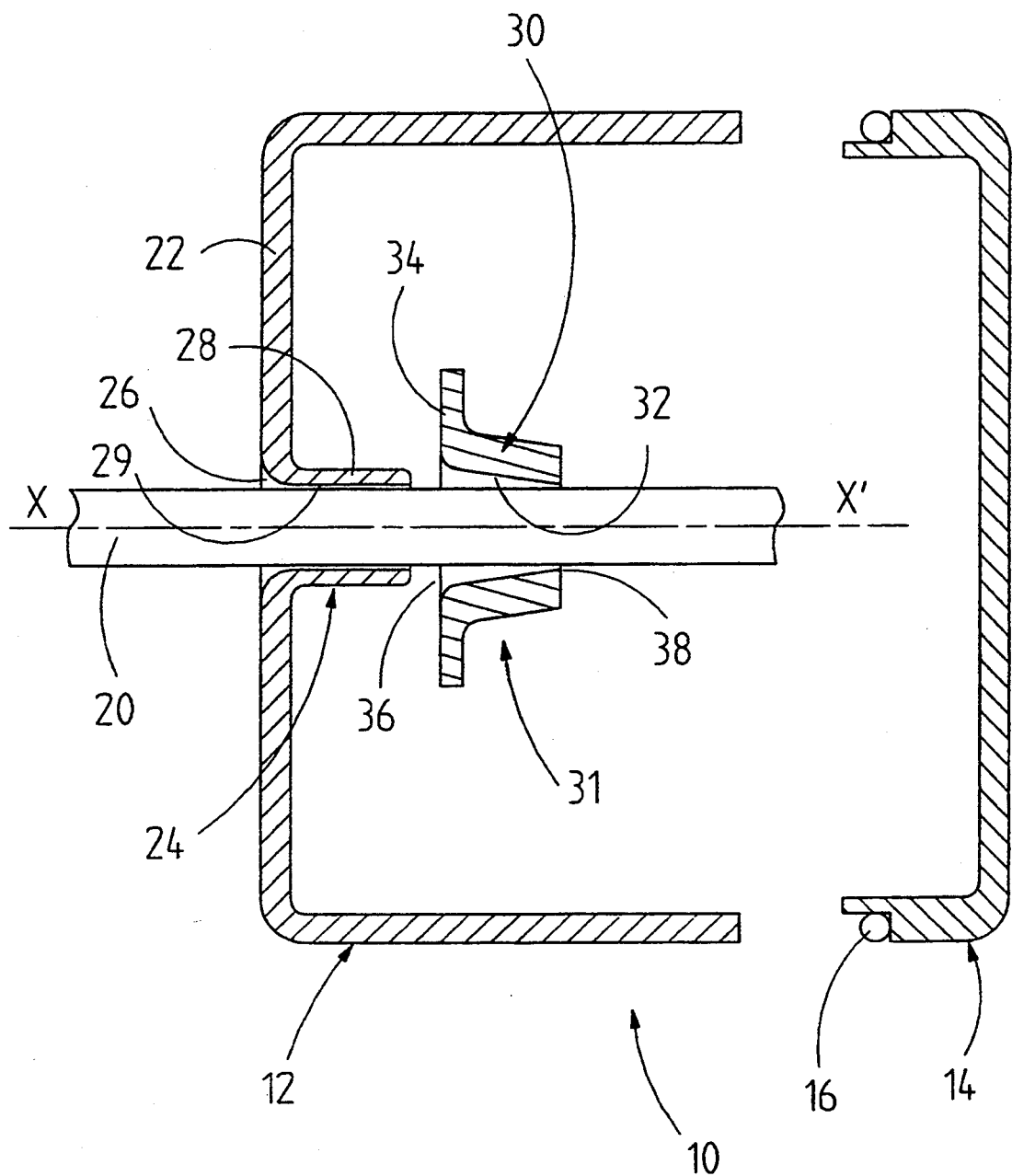
FIG. 1 is an exploded sectional view of a casing equipped with a cable passage according to the invention.
Figure 2:
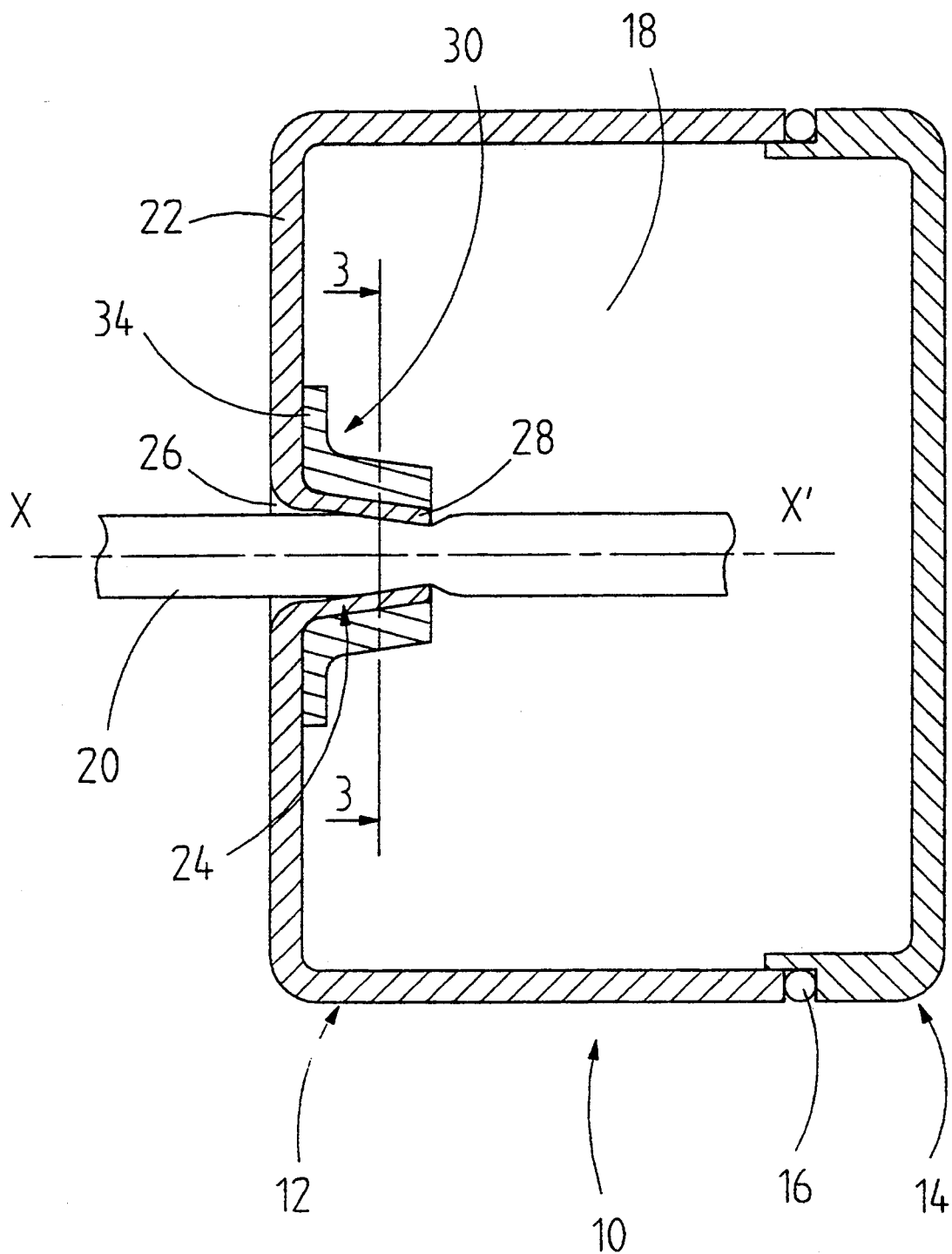
FIG. 2 shows an identical view to FIG. 1 in the assembled position of the tight passage.
Figure 3:
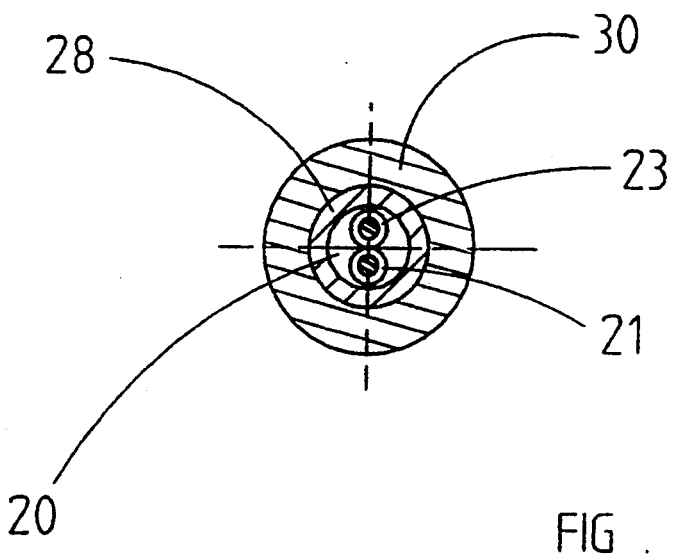
FIG. 3 represents a cross-section along the line 3—3 of FIG. 2.

Referring to FIGS. 1 to 3, a sealed casing 10 made of plastic material is made up of a base 12 on which a sealing cover 14 can be fitted with a seal 16 fitted in interposition. The internal volume 18 of the casing 10 serves the purpose of housing an electrical apparatus (not represented), which is connected to the outside by an electrical power supply cable 20.

The wall 22 of the base 12 comprises a tubular end piece 24 bounding an orifice 26 for the cable 10 to pass through. The end piece 24 is directed towards the inside of the casing 10 and has a deformable bearing flange 28 in the form of a collar having an internal lateral revolution cross-section closely following that of the cable 20. The flange 28 is molded with the base 12 and acts as retaining part of the cable 20 after an auxiliary securing part 30 has been fitted around the flange 28.

A radial clearance 29 is arranged between the flange 28 and cable 20 to enable the cable to be easily inserted in the end piece 24. The thickness of the wall of the collar 28 is less than that of the wall 22 of the base 12 so as to make the end piece 24 flexible, allowing it to be deformed as a result of the clamping action of the securing part 30.

The securing part 30 is arranged in the form of a hollow stud or button 31 having a clamping surface 32 designed to come into engagement with the external side face of the flange 28. The clamping surface 32 is located inside the button, and advantageously has a frustum shape connected to a base or stop 34 extending perpendicularly to the flange 28.

The first opening 36 of the securing part 30, located on the same side as the base 34, is larger than the external profile of the collar 28. The size of the opposite second opening 38 of the hollow button 31 corresponds appreciably to the diameter or external profile of the cable 20. The securing part 30 is rigid along the clamping surface 32 to reinforce transmission and application of the securing force on the flexible collar 28.

Implementation of the tight passage of the cable 20 into the casing 10 according to FIGS. 1 and 2 is achieved as follows:

In FIG. 1, the cable 20 is first inserted into the casing 10 via the orifice 26 of the end piece 24. The hollow button 31 of the securing part 30 is then fitted on the cable 20 inside the base 12, arranging the first opening 36 so that it is facing the collar 28. The securing part 30 is in the released position, and extends coaxially with the end piece 24 in the direction XX' of insertion of the cable 20. The presence of the clearance 29 at the level of the collar 28, and that at the level of the second opening 38 of the securing part 30 make it easy to fit the cable 20 in the course of the first assembly phase. It can be noted that the collar 28 appreciably follows the cylindrical shape of the cable 20 along the passage through the end piece 24.

During the second assembly phase illustrated in FIG. 2, the securing part 30 is pushed in translation of the end piece 24 along the direction XX' of insertion of the cable 20. The reaction of the frustum-shaped clamping surface 32 exerted on the external face of the cylindrical collar 28 in the course of the relative movement of the securing part 30 causes a progressive elastic deformation of the flexible collar 28 of the end piece 24, in such a way as to generate a clamping force on the cable 20. At the end of the insertion travel of the securing part 30, the base 34 comes up against the internal wall 22 of the base 12, and clamping of the cable 20 is maximum at the level of the second opening 38 of the securing part 30.

In a third phase, the end part 34 is then securedly united to the wall 22 of the casing by any fixing means, notably by crimping, clipping, riveting or sticking. The securing part 30 is then held in a secured position enabling the tightness in the clamping zone of the cable 20 to be permanently preserved. The cable 20 can then be connected to the electrical apparatus inside the casing 10, followed by fitting of the sealing cover 14.

FIG. 3 shows the transverse cross-section in the clamping zone according to FIG. 2, for a cable 20 of circular cross-section and with two power supply wires 21, 23 coated in a cylindrical insulating sheath. The end piece 24 initially presents a cylindrical shape, and cooperates with a frustum-shaped clamping surface 32 of the securing part 30.

When a cylindrical cable 20 is used, it would be possible to secure the securing part 30 onto the end piece 24 by a screwing movement. Suitable threads merely have to be provided on the external face of the cylindrical collar 28, and along the frustum-shaped clamping surface 32 of the securing part 30, which plays the role of a nut. At the end of the screwing travel, the securing part 30 is then automatically held in the secured position without requiring an additional fixing operation with the casing 10.

Figure 4:
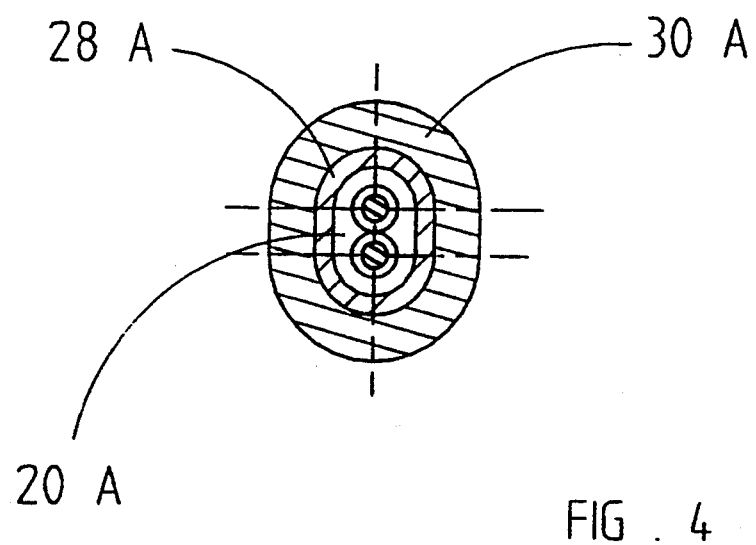
FIG. 4 is an identical view to FIG. 3 of an alternative embodiment.

It is also possible to replace the cylindrical cable 20 of FIG. 3 by a flat cable 20A, as represented in FIG. 4. The cable 20A and its insulating protecting sheath has on oblong shape. The collar 28K of the corresponding end piece 24 has a cross-section identical to that of the cable 20A, and the clamping surface 32 of the part of the securing part 30 is an oblong cross-section revolution frustum. Any other cross-section can be used depending on the nature of the power supply cable 20 passing through the end piece 24.

Figure 5:
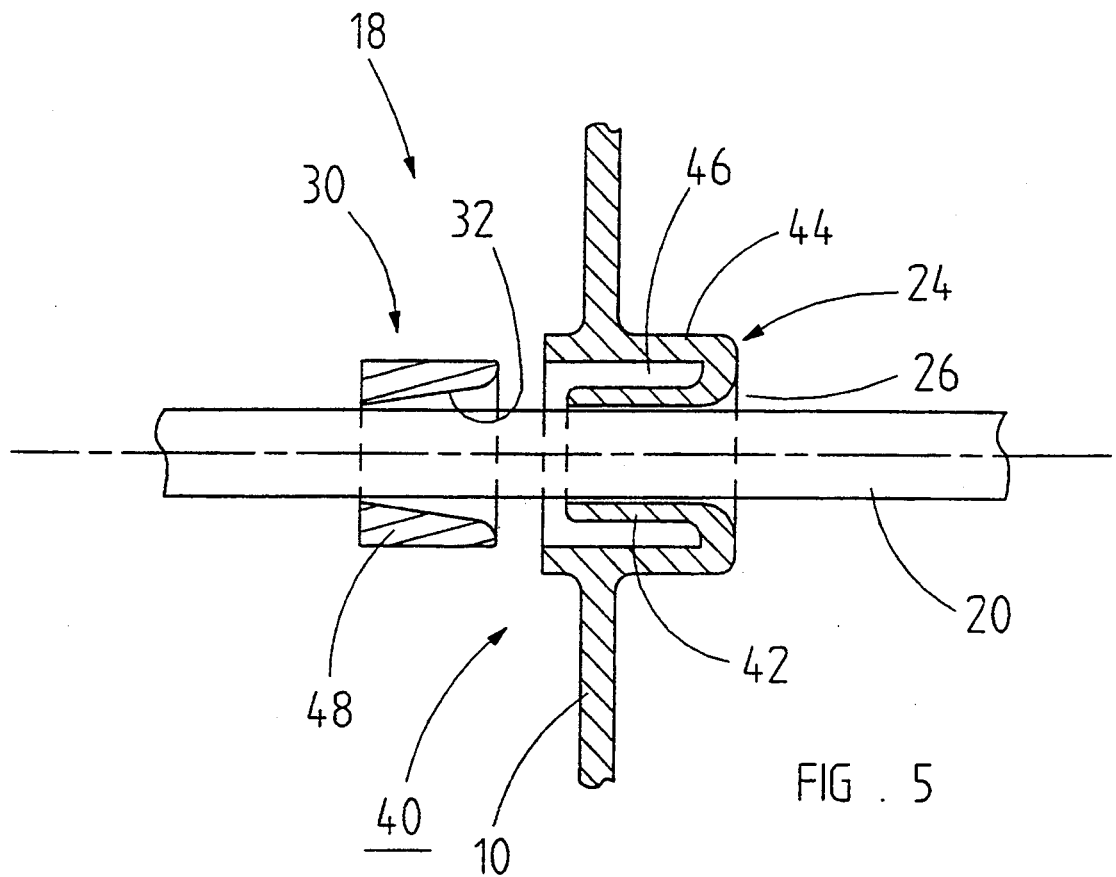
FIG. 5 is an exploded view similar to FIG. 1 of another alternative embodiment.
Figure 6:
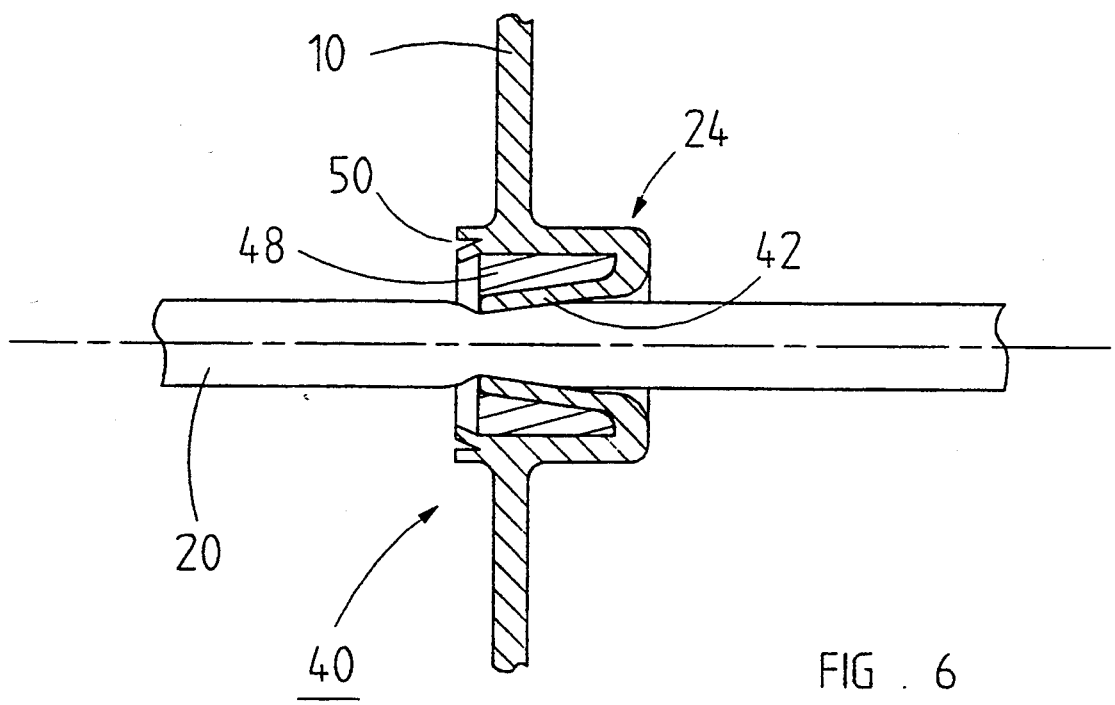
FIG. 6 shows an identical view to FIG. 5 in the assembled position of the passage.

FIGS. 5 and 6 show another embodiment of a tight passage 40 of a cable 20, wherein the end piece 24 of the casing 10 comprises a flexible lip 42 which is connected to the wall of the casing 10 by a protuberance 44 protruding outwards from the internal volume 18. The protuberance 44 is rigid and extends perpendicularly to the wall of the casing 10 so as to form with the lip 42 an annular housing 46 to accommodate the securing part 30.

In FIG. 5, the flexible lip 42 surrounds the cable 20 coaxially with a radial clearance interposed, and the securing part 30 is threaded onto the cable opposite the annular housing 46 of the end piece 24. The securing part 30 is formed by a hollow stud 48 equipped with a wedge-shaped clamping surface 32 comparable to that of FIGS. 1 and 2. Insertion of the stud 48 into the annular housing 46 of the end piece 24 by translation causes elastic deformation of the lip 42 which clamps the cable 20 progressively exerting a radial pressure ensuring the tight sealing of the passage 40 (FIG. 6).

The securing part 30 is held in the secured position in the housing 46 by gripping means 50 rendered active by a crimping operation at the end of insertion travel of the stud 48.

Figure 7:
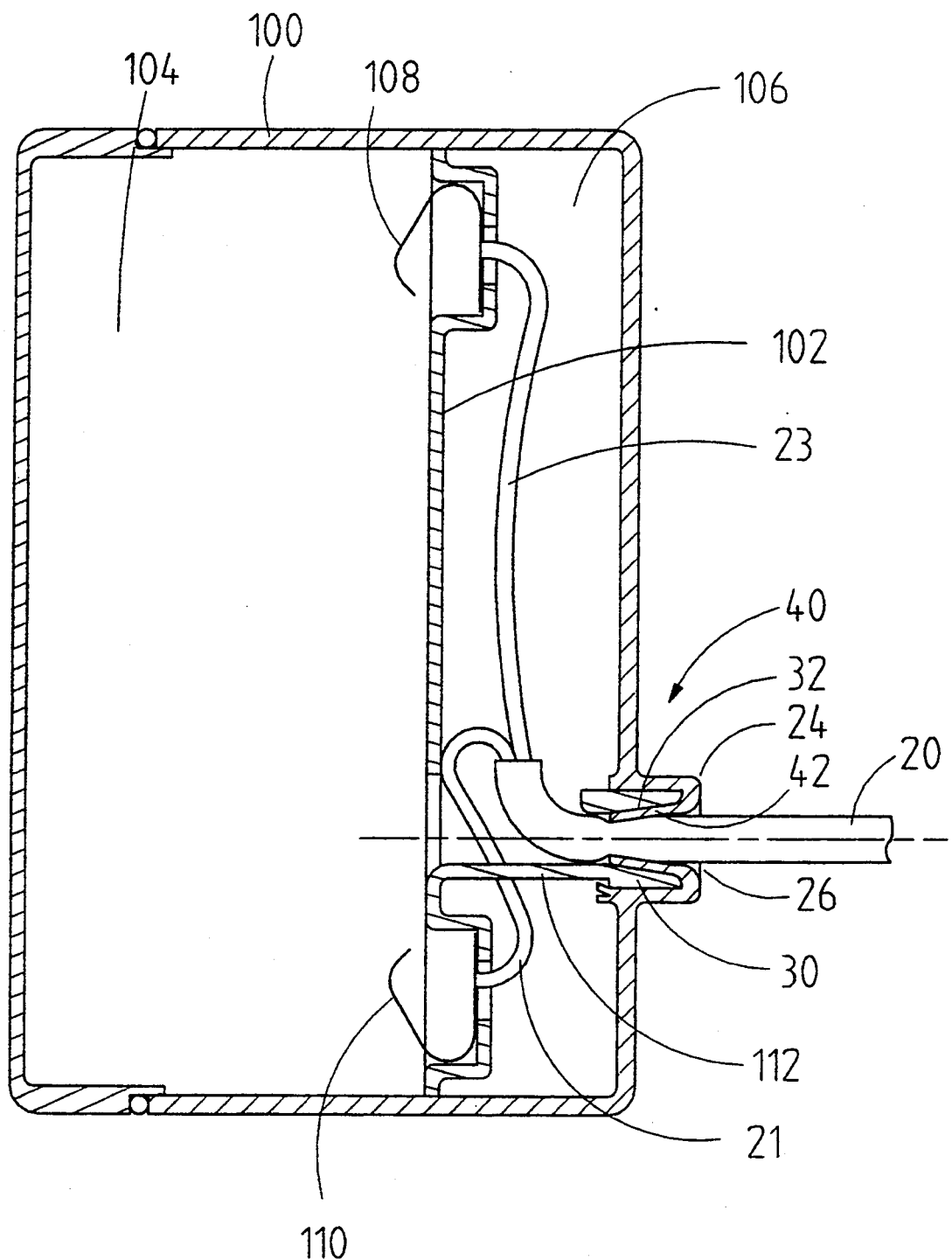
FIG. 7 represents a cross-sectional view of a casing for electrical batteries or accumulators.

In FIG. 7, the passage 40 in accordance with FIGS. 5 and 6 is applied to a casign 100 for electrical batteries or accumulators. The casing 100 is subdivided by a separating wall 102 into two adjacent compartments 104, 106, one 104 of which (on the left) contains the batteries or accumulators, and the other 106 of which (on the right) receives the conductors 21, 23 of the power supply cable 20 associated with the tight passage 40. The insulating wall 102 separating the two compartments 104, 106 acts as support for a pair of electrical contacts 108, 110 in the form of conducting blades, electrically connected to the two conductors 21, 23. The two contacts 108, 110 are housed in the compartment 104 for electrical connection of the batteries. It can be noted that the securing part 30 of the tight passage 40 of the cable 20 is mechanically connected to the wall 102 supporting the contacts 108, 110 by a connecting part 112. The assembly formed by the wall 102, connecting part 112 and stud 48 of the securing part 30 forms a monoblock part made of molded insulating material.

The clamping action of the cable 20 in the passage 40 resulting from the pressure of the securing part 30 takes place automatically when the wall 102 is fitted in positioning grooves (not represented) of the casing 100.

Figure 8:
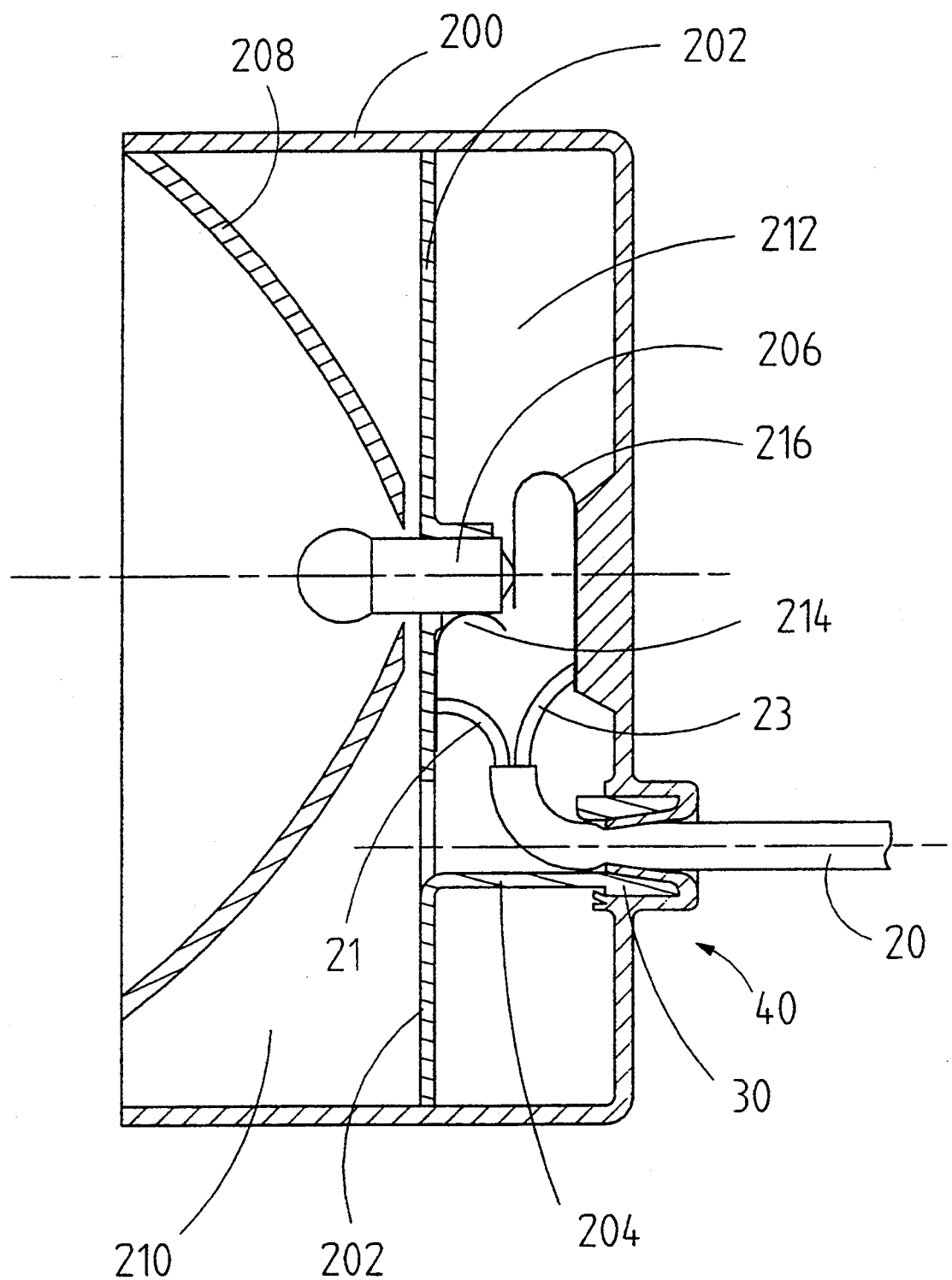
FIG. 8 is an identical view to FIG. 7 for a casing of a lighting lamp.

In FIG. 8, the passage 40 according to FIGS. 5 and 6 forms part of a sealed casing 200 of an electrical lighting lamp. The securing part 30 of the passage 40 is connected in a similar manner to a separating wall 202 by a connecting part 204. The wall 202 acts as support for the electric light bulb 206 extending perpendicularly to the wall 202. The lighting part of the bulb 206 is surrounded by a reflector 208 housed in the left-hand compartment 210. On the opposite side the base of the bulb 206 is supplied in the other right-hand compartment 212 by two contacts 214, 216 electrically connected with the two conductors 21, 23 of the cable 20.

In the two embodiments in FIGS. 7 and 8, the securing part 30 of the tight passage 40 exerts a first function of clamping the flexible lip 42 onto the cable at the level of the orifice 26 of the end piece 24, and a second function of supporting and securing an electrical accessory, notably contacts 108, 110 or a light bulb 206.

According to an alternative embodiment of FIGS. 1 and 2, the end piece 24 is oriented in the opposite direction towards the outside of the casing 10, and the securing part 30 is tightened onto the collar 28 outside the internal volume of the casing 10.

I claim:

1. A tightly sealed casing made of plastic material for housing an electrical apparatus, comprising a first wall equipped with an end piece for the passage of a power supply cable through an orifice, and sealing means designed to seal off the clearance arranged between the orifice and the external face of the cable, wherein the end piece of the casing comprises a flexible bearing flange arranged around the cable when the latter is inserted in the orifice, an auxiliary securing part is tightened onto the end piece bringing about elastic deformation of the flange and a simultaneous clamping action of the cable in the sealing zone, a clamping surface of said securing part in the shape of a rigid wedge cooperates with the flange to ensure progressive clamping of the cable when relative movement of said part takes place from a released position to a secured position, the securing part is securedly united to a second insulating separating wall supporting an electrical component arranged inside the casing.

2. The tightly sealed casing according to claim 1, used for housing electrical batteries or accumulators, wherein the second wall subdivides the internal volume of the casing into two adjacent compartments respectively containing the batteries, and the conductors of the power supply cable associated with the tight passage, said second wall acting as support for a pair of contacts for connection of the batteries.

3. The tightly sealed casing according to claim 1, used for an electrical lighting lamp, wherein the second wall acts as support for the electric light bulb, and subdivides the internal volume of the casing into two adjacent compartments respectively housing the reflector of the lamp, and the conductors of the power supply cable.

4. The tightly sealed casing according to claim 2, wherein the flexible flange is molded with the casing, and the securing part is shaped as a hollow button or stud through which the cable passes, said clamping surface being arranged inside the button to define a truncated volume of a cross-section suitable for the cable.

5. The tightly sealed casing according to claim 4, wherein the clamping surface has a frustum shape, extending between a first opening and a second opening of the hollow button, the first opening situated facing the flange having a larger diameter than that of said flange in the released position of the button, and the opposite second opening has a smaller diameter than that of the first opening.

6. The tightly sealed casing according to claim 5, wherein the securing part is provided with an end-of-travel stop arranged at the level of the first opening to come into engagement against the wall of the casing in the secured position of said part, corresponding to the maximum tightening state of the cable.

7. The tightly sealed casing according to claim 1, wherein the securing part in the secured position in the end piece is securedly united to the wall of the casing by fixing means, the pressure on the flange being exerted inside or outside the casing depending on the positioning of said part.

8. The tightly sealed casing according to claim 1, wherein the securing part is shaped as a nut tightened by screwing onto the flange.

9. The tightly sealed casing according to claim 1, wherein the flexible flange of the end piece is arranged as a flexible lip connected to a rigid protuberance of the casing to define an annular housing for accommodating the securing part.

* * * * *